United States Patent [19]

Venable

[11] 4,283,112
[45] Aug. 11, 1981

[54] TELESCOPE GUIDING SYSTEM

[76] Inventor: Thomas C. Venable, 716 Hastings St., Pittsburgh, Pa. 15206

[21] Appl. No.: 32,865

[22] Filed: Apr. 24, 1979

[51] Int. Cl.³ .......................................... G02B 23/04
[52] U.S. Cl. .................................... 350/80; 350/85; 350/31
[58] Field of Search ................... 350/80, 83, 85, 33, 350/31, 49, 19

[56] References Cited

U.S. PATENT DOCUMENTS

| 2,628,529 | 2/1953 | Braymer | 350/33 |
| 3,900,858 | 8/1975 | McCann et al. | 350/19 |

OTHER PUBLICATIONS

Cocozza, Joseph A., *Astrophotography Near City Lights*, 1977, p. 23–30.

*Primary Examiner*—Jon W. Henry
*Attorney, Agent, or Firm*—Buell, Blenko, Ziesenheim & Beck

[57] ABSTRACT

Off-axis guiding apparatus for a reflecting telescope having a main focusing tube transverse to the telescope barrel and light deflecting means in the barrel reflecting light into the main focusing tube comprises a turntable mounted to straddle the telescope barrel and supporting the main focusing tube, rotatable about the axis of that tube, and also supporting an auxiliary focusing tube having its lower end adjoining the lower end of the main focusing tube, but its axis inclined to the axis of the main focusing tube, and light deflecting means adjustably affixed to the turntable so as to deflect peripheral light from that reaching the main focusing tube into the auxiliary focusing tube.

10 Claims, 9 Drawing Figures

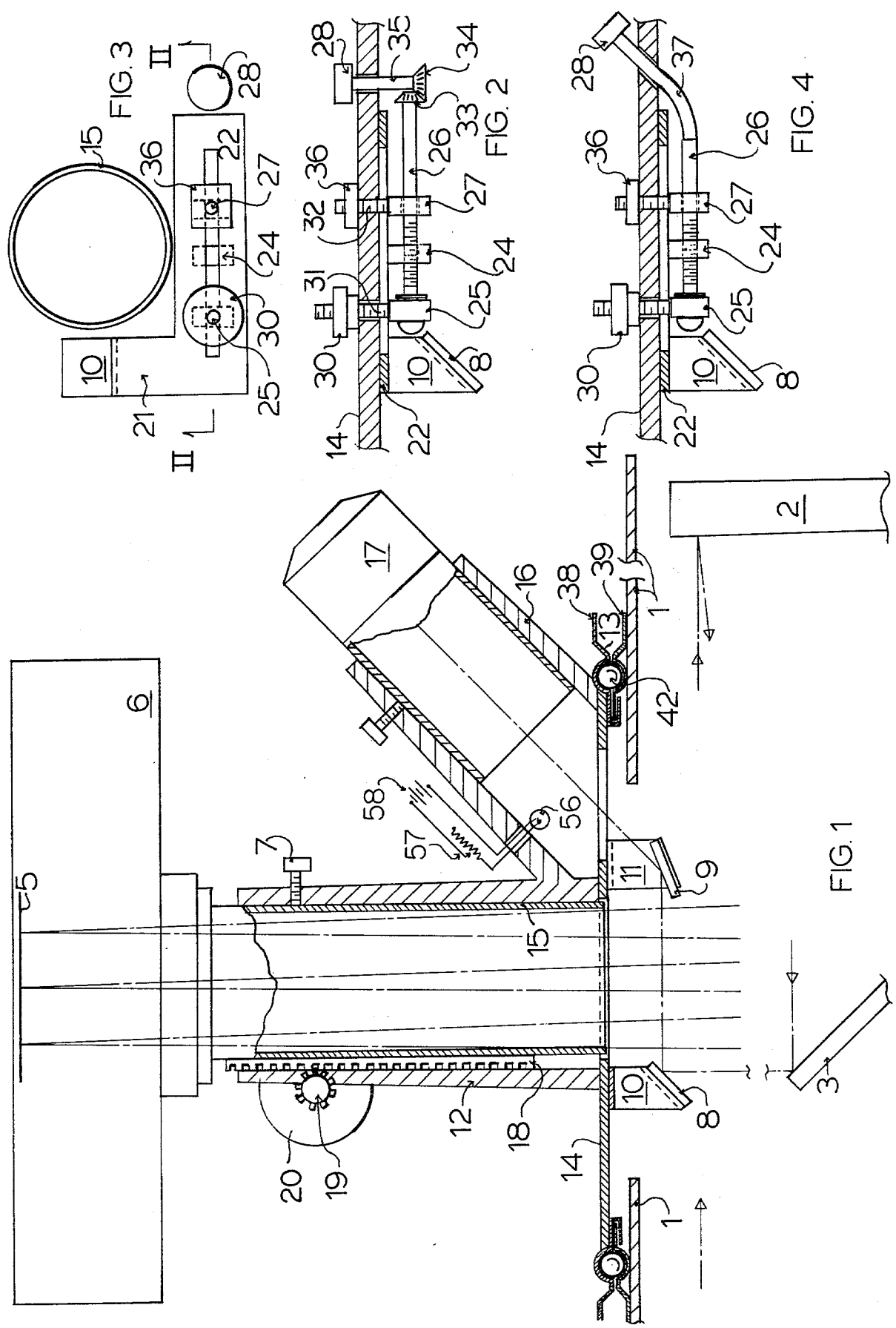

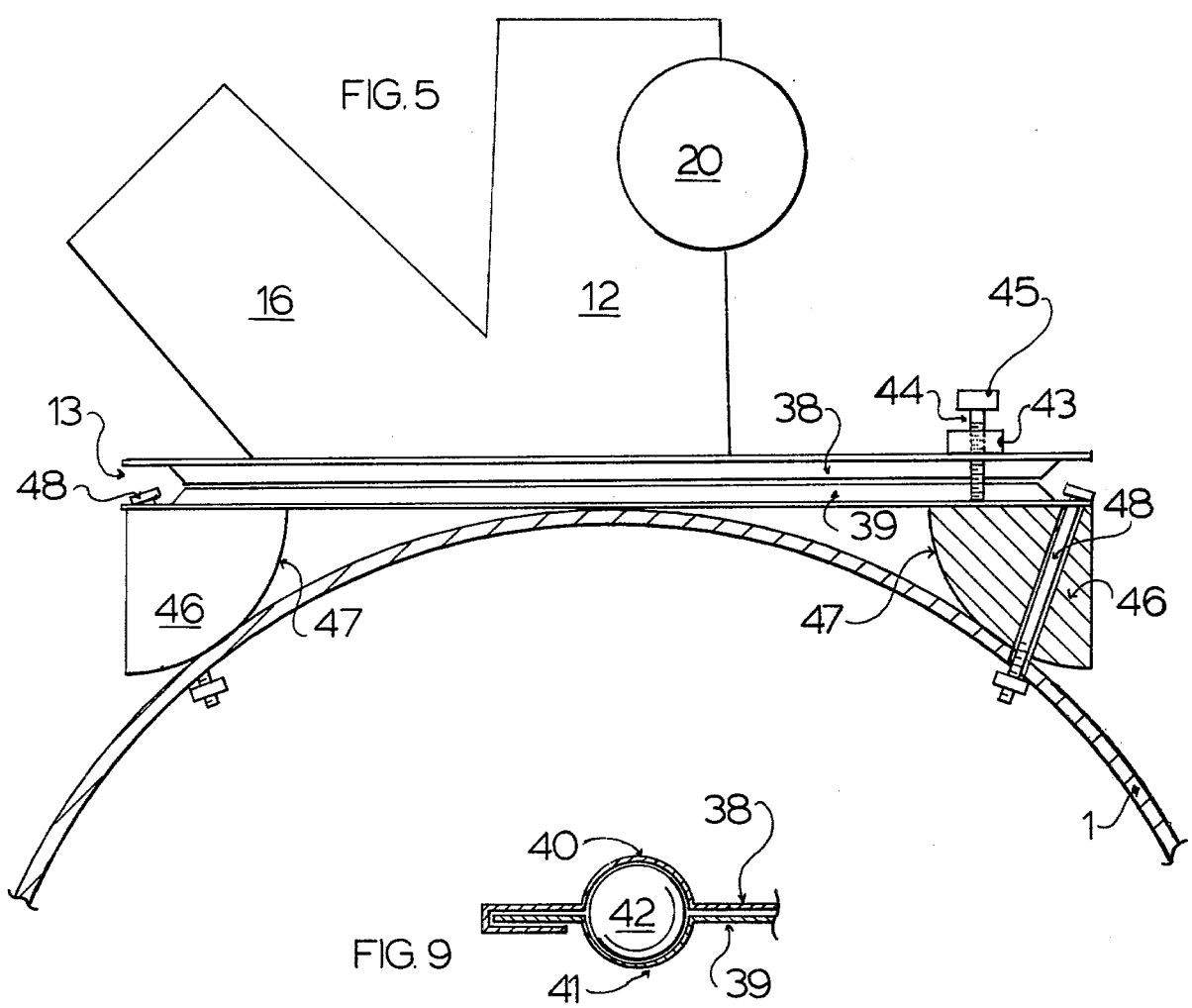
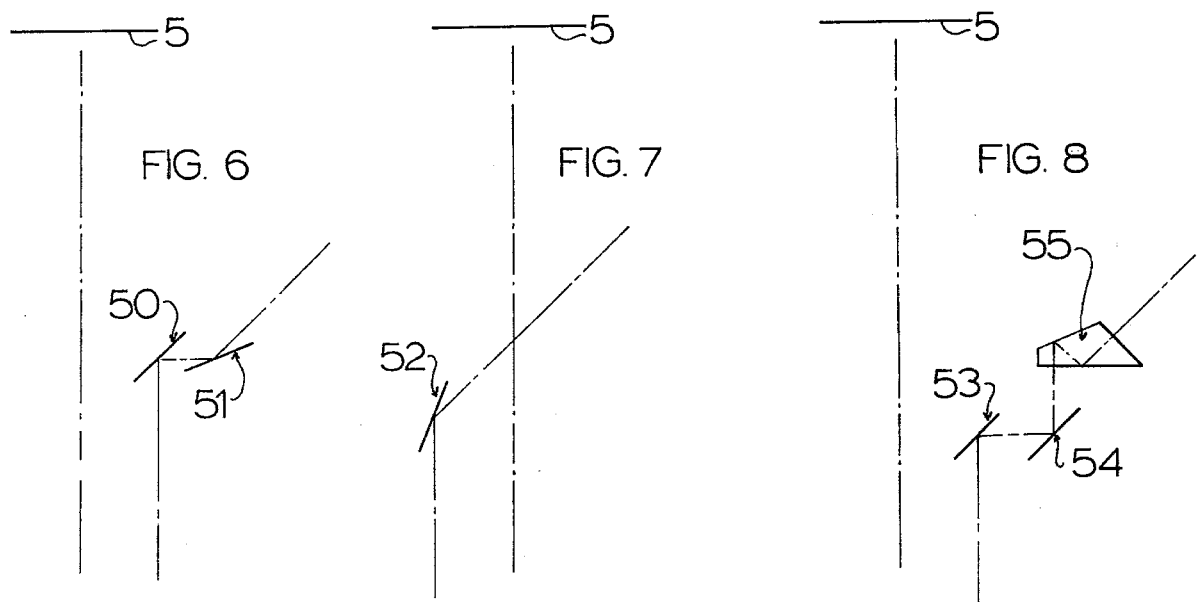

TELESCOPE GUIDING SYSTEM

BACKGROUND OF THE INVENTION

This invention relates to guiding apparatus for reflecting telescopes used for astrophotography. It is more particularly concerned with off-axis guiding apparatus.

In astrophotography reflecting telescopes are widely used. The telescope is focused on the desired object using the eyepiece in its normal position at the end of the main focusing tube and the eyepiece is then removed and replaced by a camera. As the light received from the object is usually feeble, time exposures are necessary and the telescope is normally provided with a clockwork driving mechanism to keep it pointed approximately at the desired object. In addition to this, however, manual adjustment is also necessary to keep the telescope trained precisely on the desired object. This can be done with a separate guide telescope mounted on the main telescope and kept pointed toward a bright star near the desired object.

However, this arrangement involves two sets of optics mechanically connected and the rotation of the telescope by the driving mechanism causes changes in weight distribution which results in alignment shifts detrimental to sharp photo images. Realignment of the guide telescope is required. It is, therefore, desirable to use the same optics for guiding as for photography.

Some telescope optical systems divide the light to produce two images of the same object, although the images may be of differential magnification. In such devices, the intensity of the first image is reduced by the amount of light that goes to make the second image. Apparatus of that type is shown in U.S. Pat. Nos. 991,652, 2,628,529, 2,753,760 and 3,064,526.

Another type of guiding optical system is known as off-axis guiding. In this type some light is diverted from the periphery of the light cone, relatively close to the systems focusing into a separate eyepiece tube. In this way, a second image that is off-axis from the center of the main image is produced without reducing the intensity of the main image's central light. An off-axis arrangement is disclosed on Page 23 of the book "Astrophotography Near City Lights", copyrighted 1977, by Joseph A. Cocozza. In the apparatus there shown the main focusing tube and camera are mounted on a turntable rotatable about the axis of the main fucusing tube and affixed to the wall of the telescope barrel. An auxiliary or guide focusing tube is also mounted on that turntable parallel to the main focusing tube. On the underside of the turntable and extending into the telescope barrel is mounted a pair of reflecting prisms arranged to divert a peripheral portion of the light directed into the main focusing tube sideways and upwardly into the guide focusing tube. That apparatus overcomes the objections to a separate guide telescope. However, the guide focusing tube must be spaced from the main focusing tube a distance sufficient to clear the camera on the main focusing tube, which requires a relatively large diameter turntable and a correspondingly large hole 6 to 8 inches in diameter in the telescope barrel. The apparatus, therefore, is not adaptable to small telescopes, and may not allow the user to orient the frame of the picture to the object as might be desired.

SUMMARY OF THE INVENTION

It is an object of my invention to provide off-axis guide apparatus for reflecting telescopes which is adaptable to telescopes of small diameter. It is another object to provide such apparatus which facilitates selection of a guide star. It is another object to provide such apparatus which is smoothly adjustable. It is still another object to provide such apparatus with a simple optical system. It is yet another object to provide compact apparatus as above mentioned which permits 360° orientation of the camera. It is yet another object to provide such apparatus which allows the observer to use the apparatus in a position most comfortable to him. These objects, and others which will appear in the course of the description of my invention which follows, are obtained by inclining the guide focusing tube at an acute angle to the main focusing tube so that it is mounted at its lower end immediately adjacent the main focusing tube; by utilizing adjustably positioned mirrors to direct light into the guide focusing tube, and by providing a turntable mounting for the apparatus which straddles the telescope barrel.

BRIEF DESCRIPTION OF THE DRAWINGS

FIG. 1 is a longitudinal section on a vertical plane of an embodiment of my invention presently preferred by me.

FIG. 2 is a longitudinal section on a plane II—II through FIG. 3 of a portion of the apparatus of FIG. 1 showing means for adjusting the optical system of FIG. 1.

FIG. 3 is a plan view of the apparatus of FIG. 2 as it would appear with mounting plate 14 removed.

FIG. 4 is a longitudinal section similar to that of FIG. 2 showing a modification of the means of FIG. 2.

FIG. 5 is a cross section through the apparatus of FIG. 1 showing means for mounting that apparatus on a telescope barrel.

FIG. 6 is a diagram of an alternative optics system for the apparatus of FIG. 1.

FIG. 7 is another alternative optics system.

FIG. 8 is still another alternative optics system.

FIG. 9 is a detail of the turntable of my apparatus.

DESCRIPTION OF PREFERRED EMBODIMENTS

My apparatus is used in conjunction with a reflecting telescope having a cylindrical barrel 1 with a mirror 2 which reflects light entering the telescope. That light is reflected by a diagonal mirror 3 longitudinally spaced therefrom, into main focusing tube 12 which is mounted normal to the barrel 1 and opens out of that barrel. At its upper end focusing tube 12 supports a camera 6 containing a photographic film 5. Focusing tube 12 is conventional and includes an inner telescoping tube 15 carrying a longitudinal rack 18 on its exterior surface. Tube 12 is fitted with a pinion 19 mounted on a transverse shaft having at one end a knob 20 so as to be rotated thereby. Pinion 19 engages rack 18 and causes it to move longitudinally when knob 20 is turned. A locking screw 7 is tapped into focusing tube 12 so that telescoping tube 15 can be locked thereto. Focusing tube 12 is mounted at its lower end on a flat plate 14, to be described in more detail hereinafter, and that plate is formed with a central hole of a diameter corresponding to the diameter of focusing tube 12 and coaxial therewith.

The apparatus above described is proportioned and positioned with respect to mirror 3 so that nearly all the light reflected from mirror 3 passes into main focusing tube 12 and falls on the camera film 5. Mirror 3 is large enough, however, that a peripheral portion of its reflected light falls outside the lower open end of the focusing tube 12.

An inclined mirror 8 is mounted by a bracket 10 on the underside of plate 14 so as to intercept peripheral light reflected from mirror 3 and reflect it transversely of focusing tube 12 but below it to a second inclined mirror 9, likewise mounted on the underside of plate 14 by a bracket 11. Mirror 9 is inclined so as to reflect light upwardly through a second hole in plate 14 at an acute angle to main focusing tube 12. An auxiliary or guide focusing tube 16 is affixed to plate 14 inclined thereto so as to be coaxial with the reflected light from mirror 9. This focusing tube is also provided with a telescoping inner tube and locking screw previously described, and terminates at its upper end in a ocular 17. The lower end of guide focusing tube 16 adjoins the lower end of main focusing tube 12, so minimizing the hole that must be made in the barrel of the telescope to admit light thereto, but ocular 17 is spaced from camera 6 so that the latter does not interfere with use of the former.

Mirror 8 is arranged for movement transversely to the axis of main focusing tube 12 and is shown in FIGS. 2, 3 and 4. Bracket 10 projects into telescope barrel 1 from the short leg 21 of an L-shaped member having a long leg 22, both ends 21 and 22 being positioned flat against the underside of plate 14 so that the opening into main focusing tube 12 is not obscured thereby, see FIG. 3. A slot is formed in long leg 22 of the member which is transverse to the axis of main focusing tube 12 and studs 31 and 32 spaced from each other extend through the slot in leg 22 and through plate 14. The ends of those studs below leg 22 are formed into bearings 25 and 27 respectively which journal threaded shaft 26, which mates with a nut 24 affixed to leg 22 intermediate studs 31 and 32. One end of shaft 26 carries a bevel gear 33 which meshes with a second bevel gear 34 affixed to the end of shaft 35 journaled vertically in plate 14 and extending therethrough. The other end of shaft 35 carries a knob 28. The upper ends of studs 31 and 32 are threaded and stud 32 is affixed to plate 14 by nut 36. Stud 31 is provided with a threaded locking knob 30.

Instead of the bevel gear arrangement for rotating shaft 26 a flexible shaft 37 may be connected at one end to threaded shaft 26, and its other end brought up through plate 14 and fitted with a knob 28, as is shown in FIG. 4.

Mirror 9 may be similarly mounted for adjustment toward and away from mirror 8.

Plate 14 is mounted on a turntable 13 which in turn is fastened to telescope barrel 1 by means to be described hereinafter. Turntable 13 comprises a shallow flat dish-shaped rotatable upper member 38 and a duplicate but inverted lower stationary member 39. Member 38 is formed with a concave-down semi-circular groove 40 around its outer edge and member 39 is formed with a like concave-up semi-circular groove 41 around its outer edge, which grooves 40 and 41 form a bearing race. Within this race are disposed ball bearings 42. Members 38 and 39 are annular and interlock around their inner ends as is shown in FIG. 9. Member 38 has a threaded bushing 43 affixed to the rim of its upper surface through which is threaded a locking screw 44 with a finger grip knob 45 at its upper end. Stationary turntable member 39 is supported on parallel rails 46, the facing surfaces 47 of which are arcuate in cross section so as to make line contact with a telescope barrel. Screws 48 pass through rails 46 and are fastened to telescope barrel 1, as is shown in FIG. 5. The spacing between rails 46 may be made adjustable to accommodate telescope barrels of different diameters.

A low-level light source 56, which is preferably a light-emitting diode, is positioned within guide focusing tube 16 near its lower end. Light source 56 is connected to a battery 58 or other power supply through a rheostat 57, and serves to illuminate the reticle within eyepiece 17.

In the operation of my apparatus camera 6 is removed from main focusing tube 12 and replaced by an ocular such as ocular 17. The telescope is then trained on the desired object and focused by eye, using control knob 20 to adjust the length of main focusing tube 12. The camera 6 is replaced and focused. The observer, through ocular 17 on guide focusing tube 16, attempts to find a bright star within the field of view near the desired object. As has been mentioned, some of the peripheral light reflected by mirror 3 is, in turn, reflected by mirror 8 to mirror 9 and from there through guide focusing tube 16. Plate 14 carrying mirrors 8 and 9 is slowly rotated by hand on turntable 13. If no star is picked up in 360° of rotation the position of mirror 8 is changed by rotating knob 28 which, in turn, rotates screw 26 and moves nut 24 and attached bracket 10 transversely of the main focusing tube, toward or away from mirror 9. Plate 14 is again rotated. By a succession of those operations, if necessary, a guide star is picked up. Bracket 10 is then locked in place by knob 30 and turntable 13 is locked in position by knob 45.

While I prefer to use a pair of mirrors 8 and 9 to direct a portion of the light received into guide focusing tube 16, I may use other arrangements, as are shown in FIGS. 6, 7 and 8. In FIG. 6, a first mirror 50 is positioned to divert peripheral light reflected from mirror 3 transversely of main focusing tube 12 but away therefrom onto second mirror 51, which is inclined to reflect light into an inclined guide focusing tube. In FIG. 7, a single mirror 52 is inclined so as to direct peripheral light reflected from mirror 3 transversely of main focusing tube 12 but inclined thereto directly into an inclined guide focusing tube. This arrangement inverts the image in the guide focusing tube eyepiece. In FIG. 8, a mirror 53 is positioned as is mirror 50 in FIG. 6 reflects light into a parallel mirror 54 and from there upwardly into a double reflecting prism 55 from which the light leaves in a path inclined at the angle of the guide focusing tube. An even number of reflecting surfaces presents an upright image to the eyepiece.

It will be observed that the apparatus described hereinabove accomplishes the objects set out herein. In the foregoing specification I have described presently preferred embodiments of my invention; however it will be understood that my invention can be otherwise embodied within the scope of the following claims:

I claim:

1. Guide apparatus for a reflecting telescope having a main focusing tube opening out of the wall of the telescope barrel transversely thereof, first light diverting means positioned in the telescope barrel to divert light into the main focusing tube, a separate guide focusing tube opening out of the wall of the telescope barrel and second light diverting means positioned adjoining the barrel end of the main focusing tube to divert peripheral light from the first light diverting means into the guide focusing tube, comprising a turntable having a stationary member affixed to the exterior of the telescope barrel by longitudinally extending supporting members spaced from each other transversely of the telescope barrel to straddle the telescope barrel and a rotatable member carrying the main focusing tube, the guide focusing tube and the second light diverting means.

2. Apparatus of claim 1 in which the longitudinally extending supporting members are rails of convex arcuate cross section where they rest on the telescope barrel.

3. Apparatus of claim 1 including means interlocking the stationary member and the rotatable member of the turntable to prevent disassembly thereof during rotation.

4. Apparatus of claim 3 including means for locking the stationary member and the rotatable member of the turntable together to prevent rotation thereof.

5. Apparatus of claim 1 in which the second light diverting means comprise a first element positioned to divert peripheral light only from the first light diverting means transversely of the main focusing tube, a second element positioned to divert light from the first element into the guide focusing tube, and means affixed to the turntable for moving the first element transversely of the main focusing tube.

6. Apparatus of claim 5 in which the first element is mounted on the turntable so as to divert peripheral light only from the first light diverting means transversely across the barrel opening of the main focusing tube and the second element is mounted on the turntable opposite the first element.

7. Apparatus of claim 5 in which the first element is mounted on the turntable so as to divert peripheral light only from the first light diverting means transversely away from the barrel opening of the main focusing tube and the second element is mounted on the turntable opposite the first element.

8. In guide apparatus for a reflecting telescope having a main focusing tube opening out of the wall of the telescope barrel transversely thereof, first light diverting means positioned in the telescope barrel to divert light into the main focusing tube, a guide focusing tube opening out of the telescope barrel, second light diverting means positioned adjoining the barrel end of the focusing tube to divert light from the first light diverting means into the guide focusing tube and a turntable having a stationary member affixed to the exterior of the telescope barrel and a rotatable member carrying the main focusing tube, the guide focusing tube and the second light diverting means, the improvement comprising said guide focusing tube being inclined to open out of the telescope barrel adjacent the main focusing tube at an acute angle thereto and said second light diverting means being positioned to direct only peripheral light that would not enter the main focusing tube transversely across the barrel opening of the main focusing tube into the guide focusing tube.

9. Apparatus of claim 8 in which the second light diverting means are positioned in the telescope barrel.

10. Apparatus of claim 8 in which the second light diverting means comprise a single mirror inclined at an acute angle to the axis of the main focusing tube and at an acute angle to the axis of the guide focusing tube.

* * * * *